US012798140B2

(12) United States Patent
Kuriyama et al.

(10) Patent No.: US 12,798,140 B2
(45) Date of Patent: Nov. 17, 2026

(54) CUTTING TOOL AND CUTTING APPARATUS

(71) Applicant: Sumitomo Electric Industries, Ltd., Osaka (JP)

(72) Inventors: Hiromitsu Kuriyama, Osaka (JP); Akihiro Toyoshima, Osaka (JP); Tomoya Aoki, Osaka (JP); Masashi Harada, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 343 days.

(21) Appl. No.: 18/580,627

(22) PCT Filed: Jul. 20, 2021

(86) PCT No.: PCT/JP2021/027146
§ 371 (c)(1),
(2) Date: Jan. 19, 2024

(87) PCT Pub. No.: WO2023/002567
PCT Pub. Date: Jan. 26, 2023

(65) Prior Publication Data

US 2025/0073939 A1 Mar. 6, 2025

(51) Int. Cl.

| | |
|---|---|
| ***B26D 5/08*** | (2006.01) |
| ***B23B 27/14*** | (2006.01) |
| ***B23B 29/24*** | (2006.01) |
| ***B23Q 17/09*** | (2006.01) |
| ***B26D 11/00*** | (2006.01) |

(52) U.S. Cl.
CPC .............. *B26D 5/086* (2013.01); *B23B 27/14* (2013.01); *B23B 29/242* (2013.01); *B23Q 17/0952* (2013.01); *B26D 11/00* (2013.01); *B23B 2260/024* (2013.01); *B23B 2260/10* (2013.01); *B23B 2260/128* (2013.01);
(Continued)

(58) Field of Classification Search
CPC ......... B26D 5/086; B26D 11/00; B23B 27/14; B23B 29/242; B23B 2260/024; B23B 2260/10; B23B 2260/128; B23B 2260/1285; B23Q 17/0952; B23Q 2220/002; Y02E 60/10
See application file for complete search history.

(56) References Cited

U.S. PATENT DOCUMENTS 10,478,934 B2 * 11/2019 Busi ........................ B23B 29/04
12,103,088 B2 * 10/2024 Hashimoto ........ B23Q 17/0985
(Continued)

FOREIGN PATENT DOCUMENTS

JP 2003200333 A * 7/2003
JP 2012-020359 A 2/2012
(Continued)

*Primary Examiner* — Ryan J. Walters
(74) *Attorney, Agent, or Firm* — XSENSUS LLP

(57) ABSTRACT

A cutting tool has a cutting bite, a power path, and a housing. The cutting bite includes a cutting edge, a shank that holds the cutting edge, and a sensor attached to the shank. The power path has a first terminal connected to the cutting bite and a second terminal opposite to the first terminal, and supplies power to the sensor. The housing accommodates a battery that stores power to be supplied to the power path, and is connected to the second terminal.

14 Claims, 10 Drawing Sheets

(52) U.S. Cl.
CPC ................. *B23B 2260/1285* (2013.01); *B23Q 2220/002* (2013.01); *Y02E 60/10* (2013.01)

(56) References Cited

U.S. PATENT DOCUMENTS

| | | | | |
|---|---|---|---|---|
| 2016/0178398 | A1* | 6/2016 | Krapf .................... | H01M 10/48<br>429/90 |
| 2017/0252884 | A1 | 9/2017 | Busi et al. | |
| 2022/0281046 | A1 | 9/2022 | Hashimoto | |
| 2022/0288739 | A1 | 9/2022 | Yamazaki et al. | |

FOREIGN PATENT DOCUMENTS

| | | | |
|---|---|---|---|
| JP | 2013-184275 | A | 9/2013 |
| WO | 2020/171156 | A1 | 8/2020 |
| WO | 2021/025010 | A1 | 2/2021 |
| WO | 2021/039967 | A1 | 3/2021 |
| WO | 2021/153729 | A1 | 8/2021 |

* cited by examiner

CUTTING TOOL AND CUTTING APPARATUS

CROSS-REFERENCE TO RELATED APPLICATIONS

This application is a national stage application, pursuant to 35 U.S.C. § 371, of International Patent Application No. PCT/JP2021/027146, filed Jul. 20, 2021, the entire contents of which are incorporated herein by reference.

TECHNICAL FIELD

The present disclosure relates to a cutting tool and a cutting apparatus.

BACKGROUND ART

Japanese Patent Laying-Open No. 2013-184275 (PTL 1) discloses a cutting tool attached to a turret.

CITATION LIST

Patent Literature

PTL 1: Japanese Patent Laying-Open No. 2013-184275

SUMMARY OF INVENTION

A cutting tool according to the present disclosure includes a cutting bite, a power path, and a housing. The cutting bite includes a cutting edge, a shank that holds the cutting edge, and a sensor attached to the shank. The power path has a first terminal connected to the cutting bite and a second terminal opposite to the first terminal, and supplies power to the sensor. The housing accommodates a battery that stores power to be supplied to the power path, and is connected to the second terminal.

DETAILED DESCRIPTION

Figure 1:
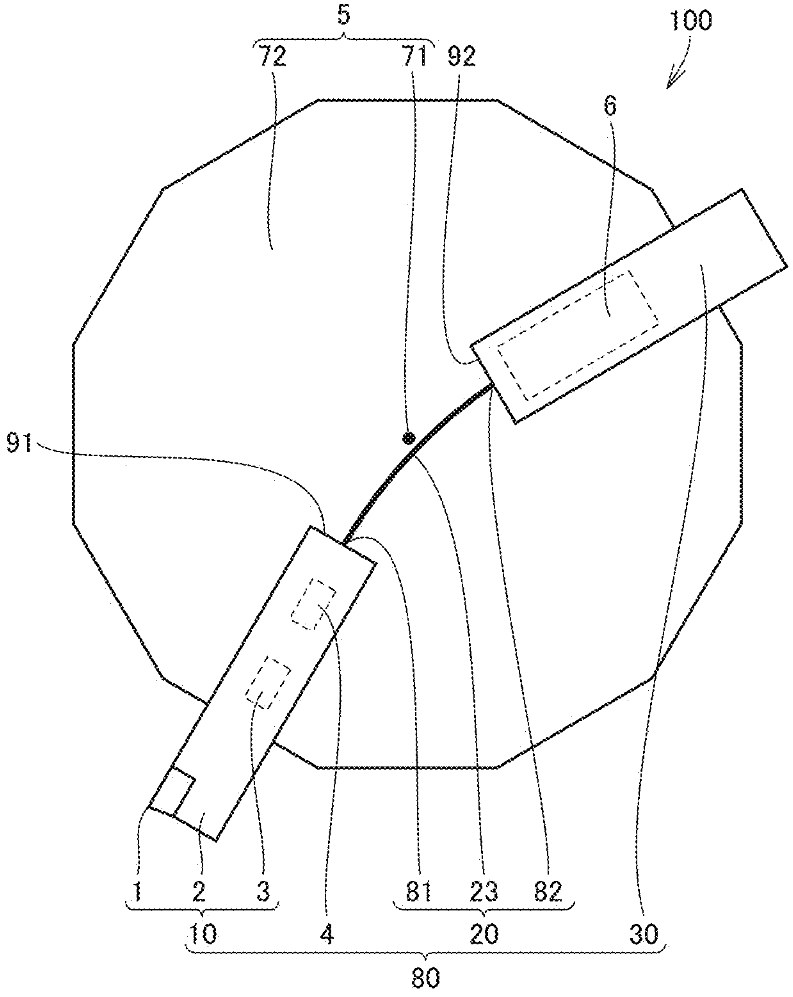
FIG. 1 is a schematic plan view showing configurations of a cutting apparatus and a cutting tool according to a first embodiment.

Problem to be Solved by the Present Disclosure

A system has been developed to analyze data obtained from a sensor attached to a cutting tool and evaluate a state of the cutting tool. The data detected by the sensor is sent to an external evaluation system using, for example, a wireless communication unit. In the evaluation system, the life of the cutting tool is predicted, for example.

In order to supply power to the sensor attached to the cutting tool, it is conceivable to supply the power to the sensor from a battery accommodated in the cutting tool. However, when the battery is accommodated in the cutting tool, the capacity of the battery cannot be large due to restriction of the size of the cutting tool. On the other hand, in order to evaluate the state of the cutting tool in real time, sampling by the sensor and wireless communication are required to be performed highly frequently. When the capacity of the battery is small, it is necessary to replace the battery frequently. Therefore, productivity in cutting could not be improved.

It is an object of the present disclosure to provide a cutting tool and a cutting apparatus so as to improve productivity in cutting.

Advantageous Effect of the Present Disclosure

According to the present disclosure, it is possible to provide a cutting tool and a cutting apparatus so as to improve productivity in cutting.

DESCRIPTION OF EMBODIMENTS

First, embodiments of the present disclosure will be listed and described.

(1) A cutting tool 80 according to the present disclosure includes a cutting bite 10, a power path 20, and a housing 30. Cutting bite 10 includes a cutting edge 1, a shank 2 that holds cutting edge 1, and a sensor 3 attached to shank 2. Power path 20 has a first terminal 81 connected to cutting bite 10 and a second terminal 82 opposite to first terminal 81, and supplies power to sensor 3. Housing 30 accommodates a battery 6 that stores power to be supplied to power path 20, and is connected to second terminal 82. Thus, battery 6 having a large capacity can be mounted in housing 30, and power can be supplied to sensor 3 using battery 6. Therefore, sensor 3 can be operated for a long time. As a result, productivity in cutting can be improved.

(2) Cutting tool 80 according to (1) may further include a communication device 4 that transmits data measured by sensor 3 to outside. Communication device 4 may be accommodated in housing 30. When communication device 4 is provided in shank 2, a recess is provided in shank 2, and communication device 4 is accommodated in the recess. In this case, rigidity of shank 2 is decreased. On the other hand, when communication device 4 is accommodated in housing 30, no recess for accommodating communication device 4 needs to be formed in shank 2. Therefore, the rigidity of cutting bite 10 can be suppressed from being decreased.

(3) In cutting tool 80 according to (2), cutting bite 10 may include a first bite 11 and a second bite 12 different from first bite 11. The power may be supplied from housing 30 to first bite 11 and second bite 12 in a branched manner. Thus, the power can be supplied from one battery 6 to the plurality of bites. Further, pieces of data measured by sensors 3 of the plurality of bites can be transmitted to the outside by one communication device 4. As compared with a case where a plurality of communication devices 4 are used, an amount of wireless communication can be reduced. Further, wireless interference can be suppressed.

(4) Cutting tool 80 according to (2) or (3) may further include a signal path 40 that transmits the data to communication device 4, signal path 40 having a third terminal 83 connected to cutting bite 10 and a fourth terminal 84 opposite to third terminal 83. Thus, the data can be efficiently transmitted to communication device 4 using signal path 40 different from power path 20.

(5) In cutting tool 80 according to any one of (1) to (4), power path 20 may be a heat-resistant cable. A chip of a workpiece cut by cutting bite 10 has a high temperature of, for example, 200° C. or more. When the chip having such a high temperature is brought into contact with power path 20, power path 20 may be damaged. Since power path 20 is a heat-resistant cable, power path 20 can be suppressed from being damaged by the chip.

(6) Cutting tool 80 according to any one of (1) to (5) may further include an tilt detection sensor 7 that is able to recognize a position of housing 30. Tilt detection sensor 7 may be accommodated in housing 30. When cutting bite 10 and housing 30 are attached to a turret 5, a positional relation between cutting bite 10 and housing 30 is determined, with the result that the position of cutting bite 10 can be identified based on the position of housing 30. Thus, power can be supplied only to sensor 3 of cutting bite 10 that is being used, without supplying power to sensor 3 of cutting bite 10 that is not being used. Therefore, power consumption of battery 6 can be reduced.

(7) In cutting tool 80 according to any one of (1) to (6), at least a portion of a side surface of housing 30 may be composed of a resin. The resin is more likely to allow a wireless electric wave to pass therethrough as compared with a metal. Since the portion of the side surface of housing 30 is composed of a resin, a wireless signal can be efficiently transmitted to the outside from communication device 4 disposed inside housing 30.

(8) In cutting tool 80 according to any one of (1) to (7), power path 20 may have a first power line portion 24 having first terminal 81, a second power line portion 25 having second terminal 82, a first connector 26 attached to first power line portion 24, and a second connector 27 attached to second power line portion 25. First connector 26 may be connected to second connector 27. Thus, housing 30 can be readily detached from cutting bite 10. Therefore, battery 6 can be readily replaced. Further, since cutting bite 10 does not need to be removed from turret 5, the cutting edge of cutting bite 10 does not need to be adjusted again.

(9) In cutting tool 80 according to any one of (1) to (8), housing 30 may have a power supply connector 51. Thus, another housing 30 connectable to power supply connector 51 can be further added.

(10) In cutting tool 80 according to any one of (1) to (9), housing 30 may have a first housing portion 31 and a second housing portion 32 different from first housing portion 31. Battery 6 may include a first battery portion 61 accommodated in first housing portion 31 and a second battery portion 62 accommodated in second housing portion 32. First battery portion 61 may be electrically connected to second battery portion 62. Thus, an operation time of sensor 3 can be further made longer.

(11) A cutting apparatus 100 according to the present disclosure may include: cutting tool 80 according to any one of (1) to (10); and a turret 5 to which cutting tool 80 is attached. Cutting bite 10 may have a first end surface 91 facing a central axis 71 of turret 5. Housing 30 may have a second end surface 92 facing central axis 71. Power path 20 may connect first end surface 91 and second end surface 92. Thus, even when turret 5 is rotated, power path 20 can be suppressed from being entangled around a workpiece or the like.

(12) In cutting apparatus 100 according to (11), housing 30 may be fixed to turret 5 using a fixation jig 63. Thus, housing 30 can be fixed to a portion of turret 5 to which another tool is attachable.

(13) In cutting apparatus 100 according to (11), housing 30 may be fixed to turret 5 using a screw 64. Thus, housing 30 can be readily attached to turret 5.

(14) In cutting apparatus 100 according to (11), housing 30 may be fixed to turret 5 using a magnet 70. Thus, housing 30 can be readily attached to turret 5.

Details of Embodiments of the Present Disclosure

Next, embodiments of the present disclosure will be described in detail with reference to figures. It should be noted that in the below-described figures, the same or corresponding portions are denoted by the same reference characters and will not be described repeatedly. Further, at least parts of the following embodiments may be appropriately combined.

First Embodiment

First, configurations of a cutting apparatus 100 and a cutting tool 80 according to a first embodiment will be described. FIG. 1 is a schematic plan view showing the configurations of cutting apparatus 100 and cutting tool 80 according to the first embodiment.

As shown in FIG. 1, cutting apparatus 100 according to the first embodiment mainly has a turret 5 and cutting tool 80. Turret 5 is a table that holds a tool. Turret 5 has a tool attachment surface 72 and a central axis 71. A plurality of tools are attached to tool attachment surface 72. Each of the plurality of tools is attached around central axis 71. For example, cutting bites are attached radially around central axis 71. Turret 5 is pivotable around central axis 71. By pivoting turret 5, switching can be readily made to a tool to be used.

As shown in FIG. 1, when viewed in a direction along central axis 71, the shape of tool attachment surface 72 is not particularly limited, but may be, for example, a substantially dodecagonal shape. Cutting tool 80 is attached to turret 5. Cutting tool 80 mainly has a cutting bite 10, a power path 20, and a housing 30. When viewed in the direction along central axis 71, power path 20 may be disposed between cutting bite 10 and housing 30. When viewed from central axis 71, cutting bite 10 may be disposed opposite to housing 30. In a radial direction perpendicular to central axis 71, cutting bite 10 may be located on the outer side with respect to power path 20. Similarly, in the radial direction perpendicular to central axis 71, housing 30 may be located on the outer side with respect to power path 20. When viewed along central axis 71 of turret 5, power path 20 may be located at a position overlapping with turret 5.

As shown in FIG. 1, cutting bite 10 may have, for example, a cutting edge 1, a shank 2, a sensor 3, and a communication device 4. Cutting edge 1 may be a cutting insert. Cutting edge 1 cuts a workpiece. Cutting bite 10 may be a turning bite. Shank 2 holds cutting edge 1. Shank 2 may be in contact with turret 5. Sensor 3 is attached to shank 2. Sensor 3 is, for example, an acceleration sensor, a strain sensor, a sound sensor, or the like. The acceleration sensor can measure, for example, a cycle of vibration of cutting tool 80, an amplitude of the vibration, or the like. Strain sensor 3 can measure, for example, a degree of bending of shank 2. The sound sensor can measure, for example, a frequency of noise generated during cutting, an amplitude of the noise, or the like.

Power path 20 is connected to cutting bite 10. Power path 20 supplies power to sensor 3 of cutting bite 10. Power path 20 has a first terminal 81, a second terminal 82, and a first intermediate path 23. Second terminal 82 is opposite to first terminal 81. First intermediate path 23 is located between first terminal 81 and second terminal 82. First terminal 81 is connected to cutting bite 10. From another viewpoint, it can be said that power path 20 is electrically connected to cutting bite 10 at first terminal 81. Power path 20 is electrically connected to sensor 3. Cutting bite 10 may have a connection wiring (not shown) that connects first terminal 81 of power path 20 and sensor 3.

As shown in FIG. 1, cutting bite 10 has a first end surface 91 facing central axis 71 of turret 5. Housing 30 has a second end surface 92 facing central axis 71. Power path 20 may connect first end surface 91 and second end surface 92. First terminal 81 may be located at first end surface 91. Second terminal 82 may be located at second end surface 92.

Power path 20 is, for example, a cable. Power path 20 may be a waterproof cable. Power path 20 may be a single-core cable or a multi-core cable. Power path 20 may have a braided shield. Power path 20 is, for example, a robot cable. Power path 20 may be, for example, an FPC (Flexible Printed Circuits). An external coating of power path 20 may be a fluororesin, silicon, glass fiber, or the like, each of which has excellent heat resistance.

Housing 30 accommodates battery 6. Battery 6 stores power to be supplied to power path 20. Specifically, battery 6 supplies power to sensor 3 via power path 20. Second terminal 82 of power path 20 is connected to housing 30. From another viewpoint, it can be said that power path 20 is electrically connected to housing 30 at second terminal 82. Power path 20 is electrically connected to battery 6. Housing 30 may have a connection wiring (not shown) that connects second terminal 82 of power path 20 and battery 6.

Battery 6 is, for example, a mobile battery. Battery 6 may be a disposable primary battery or may be a secondary battery that can be repeatedly used by charging. Battery 6 may be a lithium secondary battery, an alkaline storage battery, or a lead storage battery. Battery 6 may be a solar battery or a fuel cell.

Communication device 4 transmits data measured by sensor 3 to outside. Communication device 4 is, for example, a wireless transmission unit. Communication device 4 may transmit and receive data via a wireless signal, for example. Communication device 4 may have Bluetooth (registered trademark), a wireless LAN (Local Area Network) module, an infrared communication module, or the like.

Second Embodiment

Next, configurations of a cutting apparatus 100 and a cutting tool 80 according to a second embodiment will be described. The configuration of cutting tool 80 according to the second embodiment is different from the configuration of cutting tool 80 according to the first embodiment mainly in that communication device 4 is accommodated in housing 30, and the other configuration is the same as the configuration of cutting tool 80 according to the first embodiment. The following mainly describes the configuration different from that of cutting tool 80 according to the first embodiment.

Figure 2:
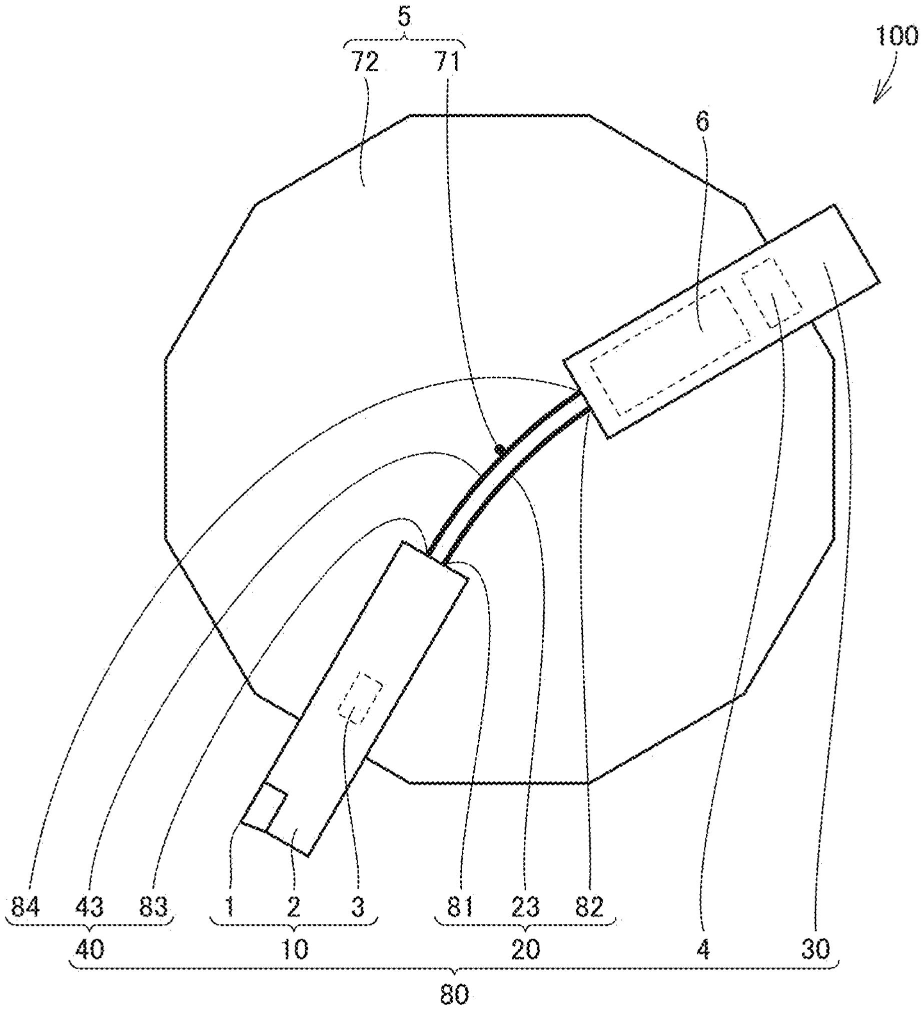
FIG. 2 is a schematic plan view showing configurations of a cutting apparatus and a cutting tool according to a second embodiment.

FIG. 2 is a schematic plan view showing the configurations of cutting apparatus 100 and cutting tool 80 according to the second embodiment. As shown in FIG. 2, communication device 4 may be accommodated in housing 30. From another viewpoint, it can be said that communication device 4 may not be attached to shank 2 of cutting bite 10. Cutting tool 80 of cutting apparatus 100 according to the second embodiment may further has a signal path 40. Signal path 40 transmits data measured by sensor 3 to communication device 4.

When viewed in the direction along central axis 71, signal path 40 may be disposed between cutting bite 10 and housing 30. In the radial direction perpendicular to central axis 71, cutting bite 10 may be located on the outer side with respect to signal path 40. Similarly, in the radial direction perpendicular to central axis 71, housing 30 may be located on the outer side with respect to signal path 40.

Signal path 40 has a third terminal 83, a fourth terminal 84, and a second intermediate path 43. Fourth terminal 84 is opposite to third terminal 83. Second intermediate path 43 is located between third terminal 83 and fourth terminal 84. Third terminal 83 is connected to cutting bite 10. From another viewpoint, it can be said that signal path 40 is electrically connected to cutting bite 10 at third terminal 83. Signal path 40 is electrically connected to sensor 3. Cutting bite 10 may have a connection wiring (not shown) that connects third terminal 83 of signal path 40 and sensor 3.

Fourth terminal 84 of signal path 40 is connected to housing 30. From another viewpoint, it can be said that signal path 40 is electrically connected to housing 30 at fourth terminal 84. Signal path 40 is electrically connected to communication device 4. Housing 30 may have a connection wiring (not shown) that connects fourth terminal 84 of signal path 40 and communication device 4. Battery 6 may supply power to communication device 4.

Signal path 40 is, for example, a cable. Signal path 40 may be a waterproof cable. Signal path 40 may be a single-core cable or a multi-core cable. Signal path 40 may have a braided shield. Signal path 40 may be, for example, a robot cable. Signal path 40 may be, for example, an FPC. An external coating of signal path 40 may be a fluororesin, silicon, glass fiber, or the like, each of which has excellent heat resistance. Signal path 40 and power path 20 may be covered with the same external coating.

Third Embodiment

Next, configurations of a cutting apparatus 100 and a cutting tool 80 according to a third embodiment will be described. The configuration of cutting tool 80 according to the third embodiment is different from the configuration of cutting tool 80 according to the second embodiment mainly in that cutting bite 10 has a plurality of bites, and the other configuration is the same as the configuration of cutting tool 80 according to the second embodiment. The following mainly describes the configuration different from that of cutting tool 80 according to the second embodiment.

Figure 3:
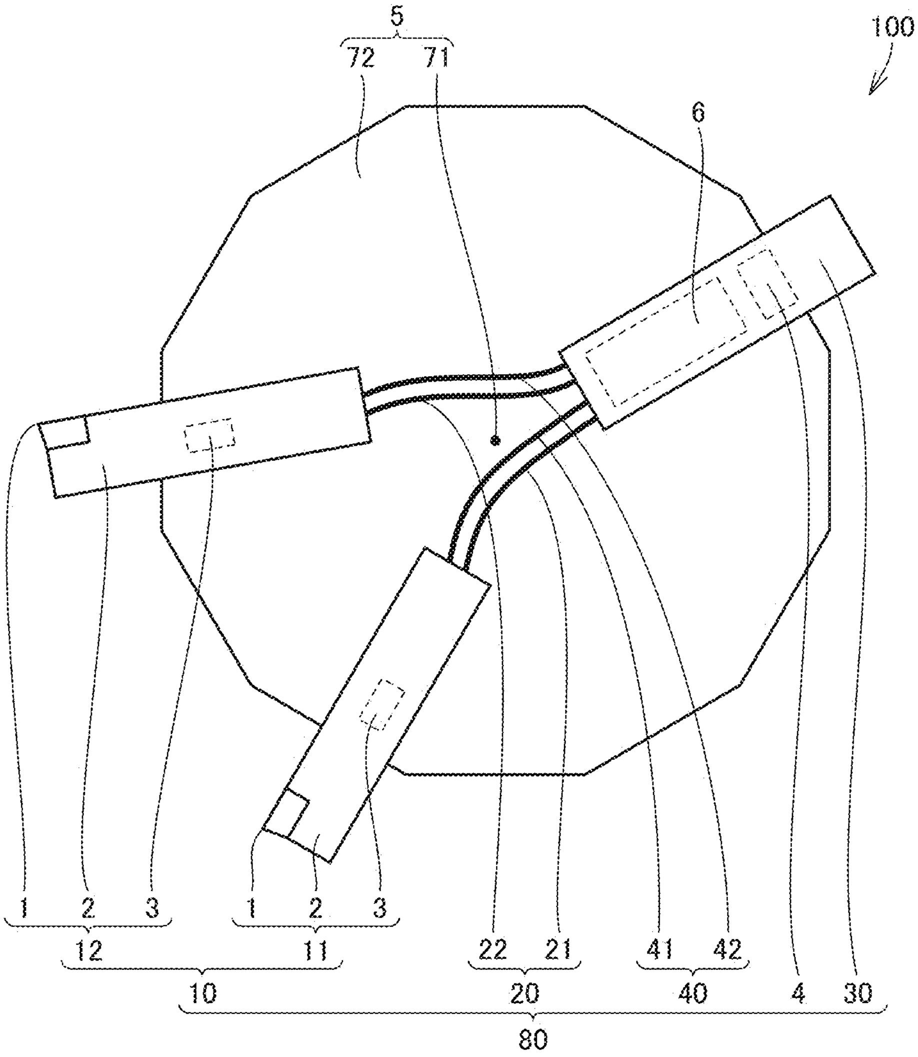
FIG. 3 is a schematic plan view showing configurations of a cutting apparatus and a cutting tool according to a third embodiment.

FIG. 3 is a schematic plan view showing the configurations of cutting apparatus 100 and cutting tool 80 according to the third embodiment. As shown in FIG. 3, cutting bite 10 may have a first bite 11 and a second bite 12. Each of first bite 11 and second bite 12 is attached to turret 5. Second bite 12 is different from first bite 11. Second bite 12 is separated from first bite 11. Each of first bite 11 and second bite 12 has cutting edge 1, shank 2, and sensor 3.

As shown in FIG. 3, power path 20 may have a first power path portion 21 and a second power path portion 22. First power path portion 21 is connected to first bite 11. First power path portion 21 supplies power to sensor 3 of first bite 11. First power path portion 21 is connected to housing 30. First power path portion 21 is electrically connected to battery 6 disposed in housing 30. Similarly, second power path portion 22 is connected to second bite 12. Second power path portion 22 supplies power to sensor 3 of second bite 12. Second power path portion 22 is connected to housing 30. Second power path portion 22 is electrically connected to battery 6 disposed in housing 30.

The power supplied from battery 6 may be supplied from housing 30 to first bite 11 and second bite 12 in a branched manner. Specifically, the power supplied from battery 6 is branched to first power path portion 21 and second power path portion 22. The power supplied from battery 6 is supplied to sensor 3 of first bite 11 via first power path portion 21. Similarly, the power supplied from battery 6 is supplied to sensor 3 of second bite 12 via second power path portion 22.

As shown in FIG. 3, signal path 40 may have a first signal path portion 41 and a second signal path portion 42. First signal path portion 41 is electrically connected to sensor 3 of first bite 11. First signal path portion 41 is electrically connected to communication device 4 disposed in housing 30. First signal path portion 41 transmits data measured by sensor 3 of first bite 11 to communication device 4. Similarly, second signal path portion 42 is electrically connected to sensor 3 of second bite 12. Second signal path portion 42 is electrically connected to communication device 4 disposed in housing 30. Second signal path portion 42 transmits data measured by sensor 3 of second bite 12 to communication device 4. That is, the pieces of data obtained from two sensors 3 may be transmitted to outside using one communication device 4.

Fourth Embodiment

Next, configurations of a cutting apparatus 100 and a cutting tool 80 according to a fourth embodiment will be described. The configuration of cutting tool 80 according to the fourth embodiment is different from the configuration of cutting tool 80 according to the third embodiment mainly in that a tilt detection sensor 7 is provided, and the other configuration is the same as the configuration of cutting tool 80 according to the third embodiment. The following mainly describes the configuration different from that of cutting tool 80 according to the third embodiment.

Figure 4:
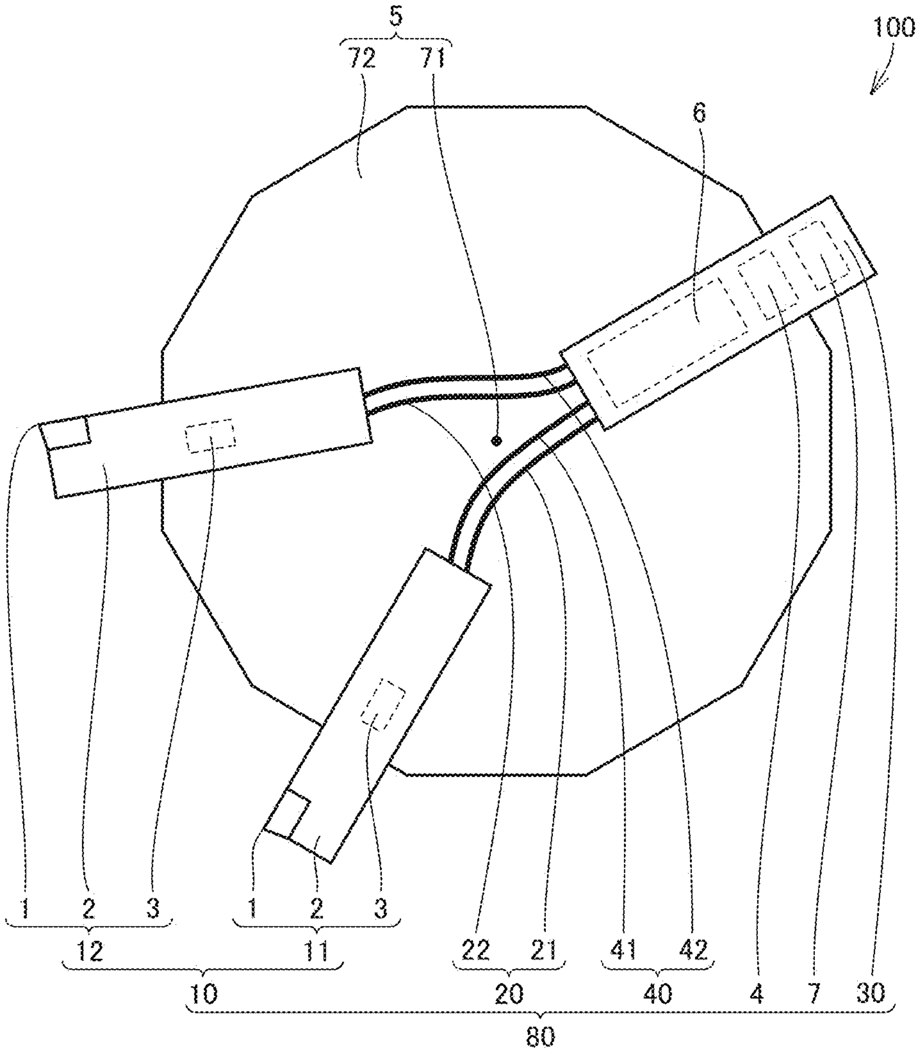
FIG. 4 is a schematic plan view showing configurations of a cutting apparatus and a cutting tool according to a fourth embodiment.

FIG. 4 is a schematic plan view showing the configurations of cutting apparatus 100 and cutting tool 80 according to the fourth embodiment. As shown in FIG. 4, cutting tool 80 according to the fourth embodiment may have tilt detection sensor 7. Tilt detection sensor 7 can recognize the position of housing 30. Tilt detection sensor 7 is accommodated in housing 30. Tilt detection sensor 7 is, for example, an acceleration sensor or a gyro sensor. Each of the acceleration sensor and the gyro sensor can recognize an tilt of housing 30 by detecting a direction of gravity. Thus, when turret 5 is rotated, the position of housing 30 can be recognized. Each of housing 30 and cutting bite 10 is fixed to turret 5. When the position of housing 30 is known, the position of cutting bite 10 can be recognized. Battery 6 may supply power to tilt detection sensor 7.

Fifth Embodiment

Next, configurations of a cutting apparatus 100 and a cutting tool 80 according to a fifth embodiment will be described. The configuration of cutting tool 80 according to the fifth embodiment is different from the configuration of cutting tool 80 according to the first embodiment mainly in that housing 30 has a plurality of housing portions, and the other configuration is the same as the configuration of cutting tool 80 according to the first embodiment. The following mainly describes the configuration different from that of cutting tool 80 according to the first embodiment.

Figure 5:
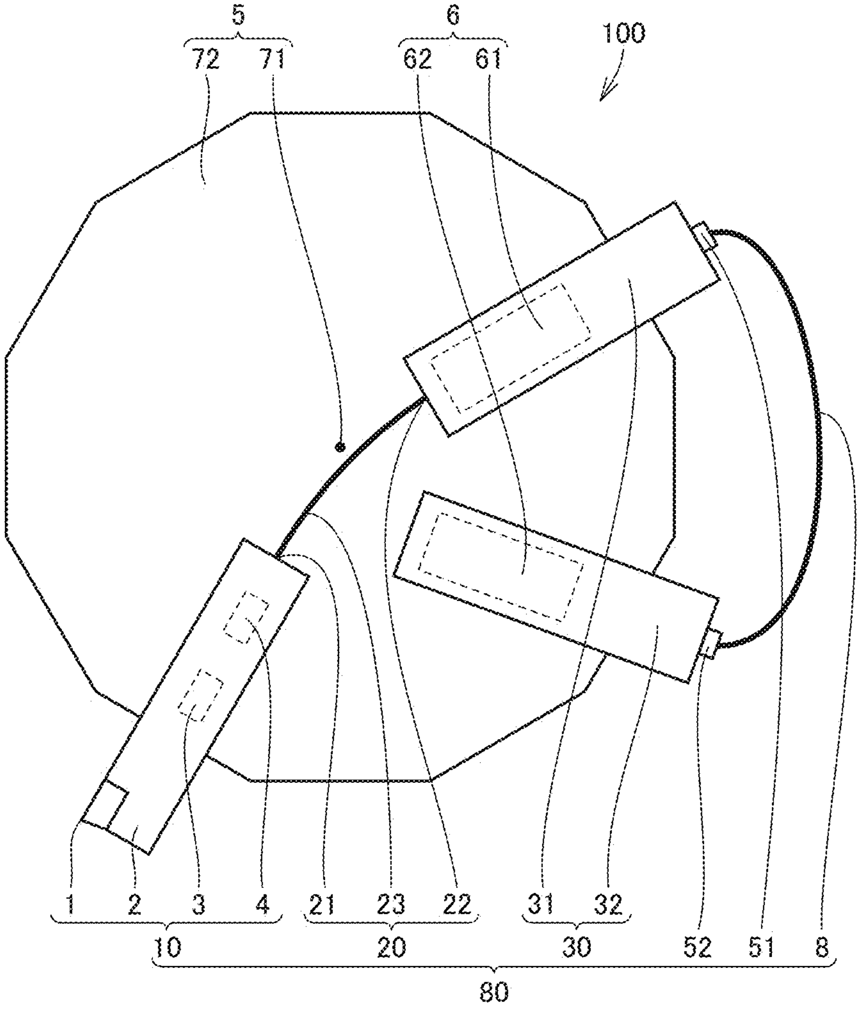
FIG. 5 is a schematic plan view showing configurations of a cutting apparatus and a cutting tool according to a fifth embodiment.

FIG. 5 is a schematic plan view showing the configurations of cutting apparatus 100 and cutting tool 80 according to the fifth embodiment. As shown in FIG. 5, housing 30 may have a first housing portion 31 and a second housing portion 32. Each of first housing portion 31 and second housing portion 32 is attached to turret 5. Second housing portion 32 is different from first housing portion 31. Second housing portion 32 is separated from first housing portion 31. First housing portion 31 may have a first power supply connector 51. Second housing portion 32 may have a second power supply connector 52.

Cutting tool 80 according to the fifth embodiment may further have a connection wiring 8. Connection wiring 8 electrically connects first power supply connector 51 and second power supply connector 52. Battery 6 has a first battery portion 61 and a second battery portion 62. First battery portion 61 is accommodated in first housing portion 31. Second battery portion 62 is accommodated in second housing portion 32. First battery portion 61 is electrically connected to second battery portion 62. Specifically, first battery portion 61 and second battery portion 62 are connected in series, for example. First battery portion 61 and second battery portion 62 may be connected in parallel.

Sixth Embodiment

Next, configurations of a cutting apparatus 100 and a cutting tool 80 according to a sixth embodiment will be described. The configuration of cutting tool 80 according to the sixth embodiment is different from the configuration of cutting tool 80 according to the first embodiment mainly in that power path 20 is detachable by connectors, and the other configuration is the same as the configuration of cutting tool 80 according to the first embodiment. The following mainly describes the configuration different from that of cutting tool 80 according to the first embodiment.

Figure 6:
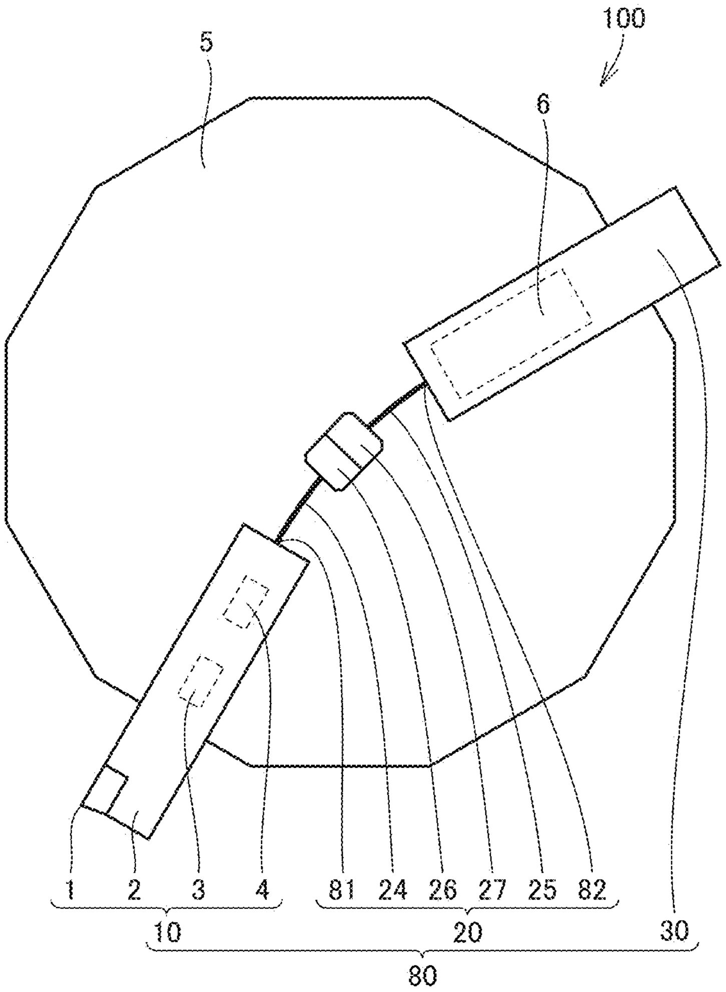
FIG. 6 is a schematic plan view showing configurations of a cutting apparatus and a cutting tool according to a sixth embodiment.

FIG. 6 is a schematic plan view showing the configurations of cutting apparatus 100 and cutting tool 80 according to the sixth embodiment. As shown in FIG. 6, power path 20 may have a first power line portion 24, a second power line portion 25, a first connector 26, and a second connector 27. First power line portion 24 has first terminal 81. Second power line portion 25 has second terminal 82.

First connector 26 is attached to first power line portion 24. First connector 26 is attached to an terminal of first power line portion 24 opposite to first terminal 81. Second connector 27 is attached to second power line portion 25. Second connector 27 is attached to an terminal of second power line portion 25 opposite to second terminal 82. First connector 26 is connected to second connector 27. First connector 26 and second connector 27 are detachable from each other. Each of first connector 26 and second connector 27 may be a waterproof connector.

<Housing>

Figure 7:
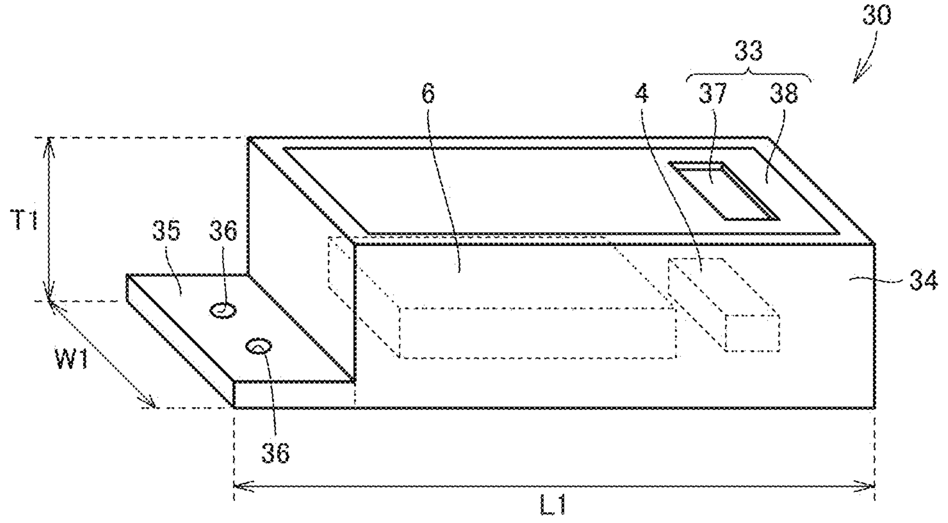
FIG. 7 is a schematic perspective view showing a configuration of a housing.

Next, a configuration of housing 30 will be described. FIG. 7 is a schematic perspective view showing the configuration of housing 30. As shown in FIG. 7, housing 30 has, for example, an accommodation portion 34, a cover portion 33, and an attachment plate portion 35. Accommodation portion 34 is composed of a metal, for example. Each of battery 6 and communication device 4 is disposed inside accommodation portion 34. Accommodation portion 34 has a substantially rectangular parallelepiped shape. Cover portion 33 is disposed at an opening of accommodation portion 34. Cover portion 33 has, for example, a metal plate portion 38 and a resin window 37. Resin window 37 may be fitted in a through hole provided in a portion of metal plate portion 38. Resin window 37 may face communication device 4. Metal plate portion 38 may face battery 6.

As described above, at least a portion of a side surface of housing 30 may be composed of a resin. Specifically, a portion of cover portion 33 may be composed of a resin, or a portion of accommodation portion 34 may be composed of a resin. From another viewpoint, it can be said that a portion of cover portion 33 other than resin window 37 may be composed of a metal. Attachment plate portion 35 may be disposed along a side of accommodation portion 34 in the short-side direction. Attachment plate portion 35 may be provided with a plurality of attachment holes 36.

When viewed in a thickness direction of cover portion 33, the length of housing 30 in the long-side direction is defined as a first length L1, and the length of housing 30 in the short-side direction is defined as a first width W1. First length L1 is larger than first width W1. The thickness of housing 30 in the thickness direction of cover portion 33 is defined as a first thickness T1. First thickness T1 may be smaller than each of first length L1 and first width W1.

The lower limit of first width W1 is not particularly limited, but may be, for example, 8 mm or more, 12 mm or more, 16 mm or more, 20 mm or more, 25 mm or more, 32 mm or more, or 40 mm or more. The upper limit of first width W1 is not particularly limited, but may be, for example, 16 mm or less, 24 mm or less, 32 mm or less, 40 mm or less, 50 mm or less, 64 mm or less, or 80 mm or less.

The lower limit of first thickness T1 is not particularly limited, but may be, for example, 8 mm or more, 12 mm or more, 16 mm or more, 20 mm or more, 25 mm or more, 32 mm or more, or 40 mm or more. The upper limit of first thickness T1 is not particularly limited, but may be, for example, 16 mm or less, 24 mm or less, 32 mm or less, 40 mm or less, 50 mm or less, 64 mm or less, or 80 mm or less.

<Attachment Method for Housing>

(First Attachment Method)

Figure 8:
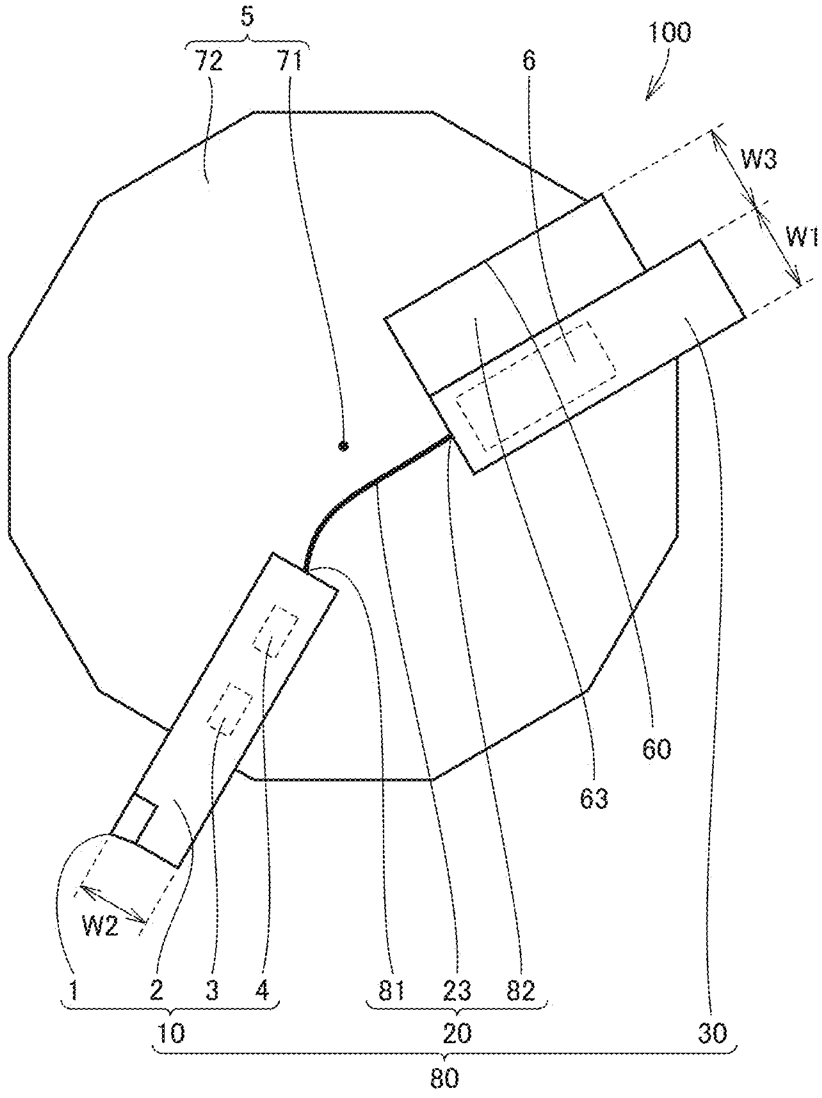
FIG. 8 is a schematic plan view showing a first attachment method for the housing.

Next, a first attachment method for housing 30 will be described. FIG. 8 is a schematic plan view showing the first attachment method for housing 30. As shown in FIG. 8, cutting apparatus 100 has a fixation jig 63. Turret 5 is provided with a tool attachment groove 60. Housing 30 may be attached to turret 5 in tool attachment groove 60. When viewed in the direction along central axis 71 of turret 5, fixation jig 63 may have a substantially rectangular shape. When viewed in the direction along central axis 71 of turret 5, the length of fixation jig 63 in the short-side direction is defined as a third width W3. Fixation jig 63 and housing 30 are disposed in tool attachment groove 60. The length of fixation jig 63 in the short-side direction may be variable. By adjusting the length of fixation jig 63 in the short-side direction, housing 30 is pressed against turret 5 by fixation jig 63. In this way, housing 30 may be fixed to turret 5.

When viewed in the direction along central axis 71 of turret 5, the width of shank 2 is defined as a second width W2. The width (first width W1) of housing 30 may be one time or more and two times or less as large as the width (second width W2) of shank 2. The lower limit of first width W1 is not particularly limited, but may be, for example, 1.1 times or more or 1.2 times or more as large as second width W2. The upper limit of first width W1 is not particularly limited, but may be, for example, 1.9 times or less or 1.8 times or less as large as second width W2.

(Second Attachment Method)

Figure 9:
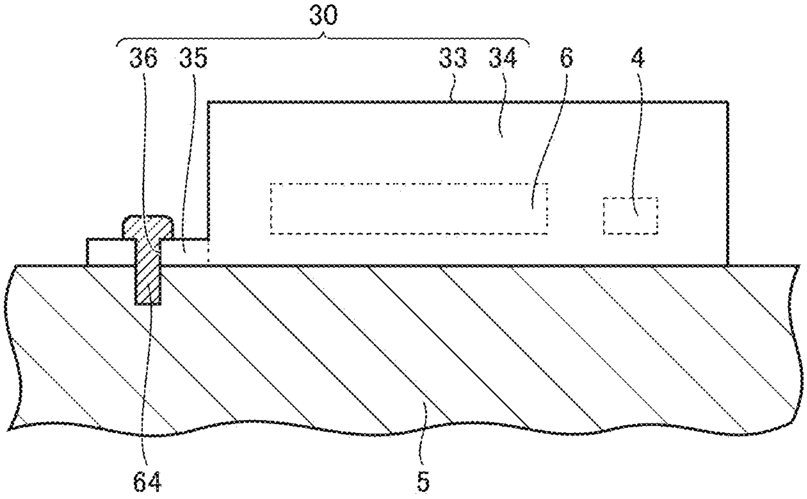
FIG. 9 is a partial schematic cross sectional view showing a second attachment method for the housing.

Next, a second attachment method for housing 30 will be described. FIG. 9 is a partial schematic cross sectional view showing the second attachment method for housing 30. As shown in FIG. 9, cutting apparatus 100 has a screw 64. Screw 64 is disposed in attachment hole 36 provided in attachment plate portion 35 of housing 30. Housing 30 may be fixed to turret 5 using screw 64. Each of attachment plate portion 35 and accommodation portion 34 of housing 30 may be in contact with turret 5. Cover portion 33 of housing 30 may be separated from turret 5.

(Third Attachment Method)

Figure 10:
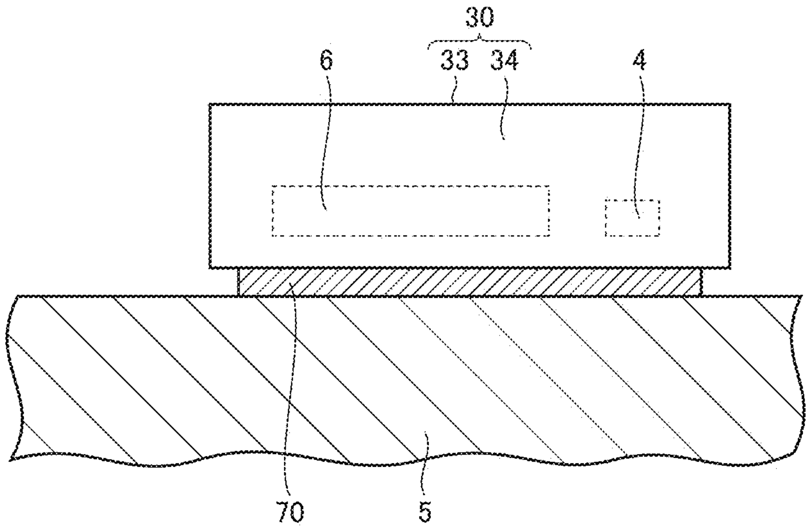
FIG. 10 is a partial schematic cross sectional view showing a third attachment method for the housing.

Next, a third attachment method for housing 30 will be described. FIG. 10 is a partial schematic cross sectional view showing the third attachment method for housing 30. As shown in FIG. 10, cutting apparatus 100 has a magnet 70. Magnet 70 is disposed between housing 30 and turret 5. Housing 30 may be fixed to turret 5 using magnet 70. Magnet 70 may be disposed on a bottom surface of accommodation portion 34 of housing 30.

Functions and Effects

Next, functions and effects of cutting tool 80 and cutting apparatus 100 according to the above-described embodiment will be described.

Cutting tool 80 according to the above-described embodiment has cutting bite 10, power path 20, and housing 30. Cutting bite 10 includes cutting edge 1, shank 2 that holds cutting edge 1, and sensor 3 attached to shank 2. Power path 20 has first terminal 81 connected to cutting bite 10 and second terminal 82 opposite to first terminal 81, and supplies power to sensor 3. Housing 30 accommodates battery 6 that stores power to be supplied to power path 20, and is connected to second terminal 82. Thus, battery 6 having a large capacity can be mounted in housing 30, and power can be supplied to sensor 3 using battery 6. Therefore, sensor 3 can be operated for a long time. As a result, productivity in cutting can be improved.

Cutting tool 80 according to the above-described embodiment may further have communication device 4 that transmits data measured by sensor 3 to outside. Communication device 4 may be accommodated in housing 30. When communication device 4 is provided in shank 2, a recess is provided in shank 2, and communication device 4 is accommodated in the recess. In this case, rigidity of shank 2 is decreased. On the other hand, when communication device 4 is accommodated in housing 30, no recess for accommodating communication device 4 needs to be formed in shank 2. Therefore, the rigidity of cutting bite 10 can be suppressed from being decreased.

Further, in cutting tool 80 according to the above-described embodiment, cutting bite 10 may include first bite 11 and second bite 12 different from first bite 11. The power may be supplied from housing 30 to first bite 11 and second bite 12 in a branched manner. Thus, the power can be supplied from one battery 6 to the plurality of bites. Further, pieces of data measured by sensors 3 of the plurality of bites can be transmitted to the outside by one communication device 4. As compared with a case where a plurality of communication devices 4 are used, an amount of wireless communication can be reduced. Further, wireless interference can be suppressed.

Further, cutting tool 80 according to the above-described embodiment may further include signal path 40 that transmits the data to communication device 4, signal path 40 having third terminal 83 connected to cutting bite 10 and fourth terminal 84 opposite to third terminal 83. Thus, the data can be efficiently transmitted to communication device 4 using signal path 40 different from power path 20.

Further, in cutting tool 80 according to the above-described embodiment, power path 20 may be a heat-resistant cable. A chip of a workpiece cut by cutting bite 10 has a high temperature of, for example, 200° C. or more. When the chip having such a high temperature is brought into contact with power path 20, power path 20 may be damaged. Since power path 20 is a heat-resistant cable, power path 20 can be suppressed from being damaged by the chip.

Further, cutting tool 80 according to the above-described embodiment may further have tilt detection sensor 7 that is able to recognize a position of housing 30. Tilt detection sensor 7 may be accommodated in housing 30. When cutting bite 10 and housing 30 are attached to turret 5, a positional relation between cutting bite 10 and housing 30 is determined, with the result that the position of cutting bite 10 can be identified based on the position of housing 30. Thus, power can be supplied only to sensor 3 of cutting bite 10 that is being used, without supplying power to sensor 3 of cutting bite 10 that is not being used. Therefore, power consumption of battery 6 can be reduced.

Further, in cutting tool 80 according to the above-described embodiment, at least a portion of the side surface of housing 30 may be composed of a resin. The resin is more likely to allow a wireless electric wave to pass therethrough as compared with a metal. Since the portion of the side surface of housing 30 is composed of a resin, a wireless signal can be efficiently transmitted to the outside from communication device 4 disposed inside housing 30.

Further, in cutting tool 80 according to the above-described embodiment, power path 20 may have first power line portion 24 having first terminal 81, second power line portion 25 having second terminal 82, first connector 26 attached to first power line portion 24, and second connector 27 attached to second power line portion 25. First connector 26 may be connected to second connector 27. Thus, housing 30 can be readily detached from cutting bite 10. Therefore, battery 6 can be readily replaced. Further, since cutting bite 10 does not need to be removed from turret 5, the cutting edge of cutting bite 10 does not need to be adjusted again.

Further, in cutting tool 80 according to the above-described embodiment, housing 30 may have power supply connector 51. Thus, another housing 30 connectable to power supply connector 51 can be further added.

Further, in cutting tool 80 according to the above-described embodiment, housing 30 may have first housing portion 31 and second housing portion 32 different from first housing portion 31. Battery 6 may include first battery portion 61 accommodated in first housing portion 31 and second battery portion 62 accommodated in second housing portion 32. First battery portion 61 may be electrically connected to second battery portion 62. Thus, an operation time of sensor 3 can be further made longer.

Cutting apparatus 100 according to the above-described embodiment may have cutting tool 80 and turret 5 to which cutting tool 80 is attached. Cutting bite 10 may have first end surface 91 facing central axis 71 of turret 5. Housing 30 may have second end surface 92 facing central axis 71. Power path 20 may connect first end surface 91 and second end surface 92. Thus, even when turret 5 is rotated, power path 20 can be suppressed from being entangled around a workpiece or the like.

In cutting apparatus 100 according to the above-described embodiment, housing 30 may be fixed to turret 5 using fixation jig 63. Thus, housing 30 can be fixed to a portion of turret 5 to which another tool is attachable.

In cutting apparatus 100 according to the above-described embodiment, housing 30 may be fixed to turret 5 using screw 64. Thus, housing 30 can be readily attached to turret 5.

Further, in cutting apparatus 100 according to the above-described embodiment, housing 30 may be fixed to turret 5 using magnet 70. Thus, housing 30 can be readily attached to turret 5.

The embodiments disclosed herein are illustrative and non-restrictive in any respect. The scope of the present application is defined by the terms of the claims, rather than the embodiments described above, and is intended to include any modifications within the scope and meaning equivalent to the terms of the claims.

REFERENCE SIGNS LIST

1: cutting edge; 2: shank; 3: sensor; 4: communication device; 5: turret; 6: battery; 7: tilt detection sensor; 8: connection wiring; 10: cutting bite; 11: first bite; 12: second bite; 20: power path; 21: first power path portion; 22: second power path portion; 23: first intermediate path; 24: first power line portion; 25: second power line portion; 26: first connector; 27: second connector; 30: housing; 31: first housing portion; 32: second housing portion; 33: cover portion; 34: accommodation portion; 35: attachment plate portion; 36: attachment hole; 37: resin window; 38: metal plate portion; 40: signal path; 41: first signal path portion; 42: second signal path portion; 43: second intermediate path; 51: power supply connector (first power supply connector); 52: second power supply connector; 60: tool attachment groove; 61: first battery portion; 62: second battery portion; 63: fixation jig; 64: screw; 70: magnet; 71: central axis; 72: tool attachment surface; 80: cutting tool; 81: first terminal; 82: second terminal; 83: third terminal; 84: fourth terminal; 91: first end surface; 92: second end surface; 100: cutting apparatus; L1: first length; T1: first thickness; W1: first width; W2: second width; W3: third width.

The invention claimed is:

1. A cutting tool comprising:

a cutting bite having a cutting edge, a shank that holds the cutting edge, and a sensor attached to the shank;

a power path that supplies power to the sensor, the power path having a first terminal connected to the cutting bite and a second terminal opposite to the first terminal;

a housing that accommodates a battery that stores power to be supplied to the power path, the housing being connected to the second terminal; and a tilt detection sensor that is able to recognize a position of the housing, wherein the tilt detection sensor is accommodated in the housing, and wherein the power path is configured to supply power from the battery to the sensor when the tilt detection sensor identifies that the cutting bite is in a specific position.

2. The cutting tool according to claim 1, further comprising a communication device that transmits data measured by the sensor to outside, wherein the communication device is accommodated in the housing.

3. The cutting tool according to claim 2, wherein the cutting bite includes a first bite and a second bite different from the first bite, and the power is supplied from the housing to the first bite and the second bite in a branched manner.

4. The cutting tool according to claim 2, further comprising a signal path that transmits the data to the communication device, the signal path having a third terminal connected to the cutting bite and a fourth terminal opposite to the third terminal.

5. The cutting tool according to claim 2, wherein:

the housing includes an accommodation portion and a cover portion, the accommodation portion is composed of metal, and at least a portion of a side surface of the housing is composed of a resin window that faces the communication device such that wireless signal transmission from inside the metal accommodation portion are able to pass therethrough to outside of the cutting tool.

6. The cutting tool according to claim 1, wherein the power path is a heat-resistant cable.

7. The cutting tool according to claim 1, wherein at least a portion of a side surface of the housing is composed of a resin.

8. The cutting tool according to claim 1, wherein the power path has a first power line portion having the first terminal, a second power line portion having the second terminal, a first connector attached to the first power line portion, and a second connector attached to the second power line portion, and the first connector is connected to the second connector.

9. The cutting tool according to claim 1, wherein the housing has a power supply connector.

10. The cutting tool according to claim 1, wherein the housing has a first housing portion and a second housing portion different from the first housing portion, the battery includes a first battery portion accommodated in the first housing portion and a second battery portion accommodated in the second housing portion, and the first battery portion is electrically connected to the second battery portion.

11. A cutting apparatus comprising:

the cutting tool according to claim 1; and a turret to which the cutting tool is attached, wherein the cutting bite has a first end surface facing a central axis of the turret, the housing has a second end surface facing the central axis, and the power path connects the first end surface and the second end surface.

12. The cutting apparatus according to claim 11, wherein the housing is fixed to the turret using a fixation jig.

13. The cutting apparatus according to claim 11, wherein the housing is fixed to the turret using a screw.

14. The cutting apparatus according to claim 11, wherein the housing is fixed to the turret using a magnet.

* * * * *